United States Patent
Hitchens et al.

(10) Patent No.: US 6,221,224 B1
(45) Date of Patent: Apr. 24, 2001

(54) FLUID MANAGEMENT SYSTEM FOR ELECTROKINETIC REMEDIATION

(75) Inventors: G. Duncan Hitchens, Bryan; Dalibor Hodko, College Station, both of TX (US)

(73) Assignee: LynnTech, Inc., College Station, TX (US)

( * ) Notice: Subject to any disclaimer, the term of this patent is extended or adjusted under 35 U.S.C. 154(b) by 0 days.

(21) Appl. No.: 09/124,549

(22) Filed: Jul. 29, 1998

Related U.S. Application Data (60) Provisional application No. 60/057,207, filed on Aug. 26, 1997.

(51) Int. Cl.[7] .................................................. C02F 1/46
(52) U.S. Cl. ................................. 204/515; 588/204
(58) Field of Search ................................. 204/515, 600; 588/204

(56) References Cited

U.S. PATENT DOCUMENTS

| | | |
|---|---|---|
| 2,831,804 | 4/1958 | Collopy . |
| 3,782,465 | 1/1974 | Bell . |
| 4,367,132 | 1/1983 | Bell . |
| 4,382,341 | 5/1983 | Bell . |
| 4,453,594 | 6/1984 | Patten . |
| 4,479,857 | 10/1984 | Barton . |
| 4,495,990 | 1/1985 | Titus . |
| 5,074,986 | 12/1991 | Probstein . |
| 5,137,608 | 8/1992 | Acar . |
| 5,398,756 | 3/1995 | Brodsky . |
| 5,405,509 | 4/1995 | Lomasney . |
| 5,416,257 | 5/1995 | Peters . |
| 5,435,895 | * 7/1995 | Lindgren et al. ............. 204/515 |
| 5,458,747 | 10/1995 | Marks . |
| 5,476,992 | 12/1995 | Ho . |

(List continued on next page.)

FOREIGN PATENT DOCUMENTS

| | | |
|---|---|---|
| 88202274 | 10/1988 | (EP) . |
| 88202274 | 1/1991 | (NL) . |

OTHER PUBLICATIONS

Aug. 1992, Sibel Pamukcu, No Title Written.
Nov. 4, 1994, Julie E. Sauer, No Title Written.
Cifford J. Bruell, p. 68–83 (No Date or Title Provided).
No Title Written, Summer 1986, Donald D. Runnells, No Month Provided.
No Title Written, 1994, A. Ugaz', p. 183–200, No Month Provided.
No Title Written, Nov. 6, 1994, Jeanne Trombly.
No Title Written, May 15 1994, Fritz G. Will.
No Title Written, Nov. 20, 1993, Earth Science.
No Title Written, 1995, Yalcin B. Acar, No Month Provided.
No Title Written, Sep. 19–21, 1994, D. Hodko.
No Title Written, Jun. 16–17, 1993, Dalibor Hodko.
No Title Written, Apr. 23, 1993, Ronald F. Probstein.
Sunirmal Banerjee (No Date or Title Provided).
No Title Written, Sep. 27–29, 1993, Dalibor Hodko.
No Title Written, Jul. 1986, T. Katan' and P.J. Carlen.

(List continued on next page.)

*Primary Examiner*—Arun S. Phasge
(74) *Attorney, Agent, or Firm*—Streets & Steele; Jeffrey L. Streets (57) ABSTRACT

A system for managing fluids used during electroremediation of contaminants in a porous medium, such as soil is disclosed. The system monitors the fluid gain and loss from the electrode wells and maintains optimal fluid levels in the wells on an individual basis. The system may use a sensor element for measuring the metal ion content of the electrode well fluid. A method for using the fluid management system is also disclosed.

33 Claims, 2 Drawing Sheets

U.S. PATENT DOCUMENTS

| | | |
|---|---|---|
| 5,489,370 | 2/1996 | Lomasney . |
| 5,584,980 | 12/1996 | Griffith . |
| 5,616,235 | 4/1997 | Acar . |
| 5,725,752 | 3/1998 | Sunderland . |
| 5,976,348 * | 11/1999 | Pugh .................................... 204/515 |

OTHER PUBLICATIONS

No Title Provided, Burton A. Segall, p. 84–101, (No Date).

No Title Provided, 1993, Yalcin B. Acar, p. 141–151, No Month.

No Title Provided, 1992, Akram N. Alshawabkeh, No Month.

* cited by examiner

FLUID MANAGEMENT SYSTEM FOR ELECTROKINETIC REMEDIATION

FIELD OF THE INVENTION

This non-provisional U.S. national application, filed under 35 USC §111(a) claims, under 35 USC §119(e)(1), the benefit of the filing date of provisional U.S. application Ser. No. 60/057,207 filed on Aug. 26, 1997 under 35 USC §111(b).

The present invention relates to a system and method for managing fluids used during electroremediation of contaminants in a porous medium, such as soil.

BACKGROUND OF THE RELATED ART

Electrokinetic phenomena include electromigration, electroosmosis, and electrophoresis. Electroosmosis is defined as the mass flux of a fluid containing ions through a stationary porous medium caused by the application of an electrical potential. The fluid moves through the voids in the porous medium (e.g. soil) called pores. Each pore has a thin layer of charged fluid next to the pore wall having a typical thickness of between about 1 and about 10 nanometers. The thin layer of charged fluid next to the pore wall is present to neutralize the charge on the surface of the soil particle that forms the pore wall. Fluid movement occurs in soil pores because of the charge interaction between the bulk of the liquid in the pore and the thin layer of charged fluid next to the pore wall. Under the influence of a DC electric field, the thin layer of charged fluid moves in a direction parallel to the electric field. Large amounts of liquid may be transported along with the thin layer of charged fluid as well as contaminants or other species contained within the liquid.

In contrast, electromigration is defined as the mass flux of a charged ionic or polar species within a liquid or solution from one electrode to another electrode. Electromigration and electroosmosis may occur simultaneously and are the dominant mechanisms through which conventional electrokinetic transport processes occur.

Electroosmosis has been used for fifty years as a method for dewatering soils and sludges. One recent application in which electrokinetic transport of materials has found practical use is the electrokinetic remediation of contaminants in soil. Electrokinetic remediation, frequently referred to as either electrokinetic soil processing, electromigration, electrochemical decontamination or electroremediation, uses electrical currents applied across electrode pairs placed in the ground to extract radionuclides, heavy metals, certain organic compounds, or mixed inorganic and organic species from soils and slurries. The contaminants in a liquid phase in the soil are moved under the action of the electrical field to wells where the contaminants are then pumped out.

During electrokinetic processing, water in the immediate vicinity of the electrodes is electrolyzed to produce $H^+$ ions at the anode and $OH^-$ ions at the cathode, causing the pH of the soil to change, according to the following equations.

Anode Reaction

Equation (1)

$$2H_2O \rightarrow O_2 + 4e^- + 4H^+$$

Cathode Reaction

Equation (2)

$$2H_2O + 2e^- \rightarrow H_2 + 2OH^-$$

If the ions produced are not removed or neutralized, these reactions lower the pH at the anode and raise the pH at the cathode. Protons formed at the anode migrate towards the cathode and can aid in contaminant removal by solubilizing certain types of contaminants to form ionic species that are readily transported through the soil via electromigration or along with the charged fluid traveling in the soil pores thus increasing contaminant extraction. In contrast, the negatively charged hydroxyl ions formed at the cathode do not migrate as efficiently as protons in soil having a predominantly negative charge and can increase the soil pH in the cathode region to as high as a pH of 12. An increase of pH can cause deposition of insoluble species and precipitation of soluble species at or in the vicinity of the cathode thereby forming regions of high electrical resistivity and lowering the rate of electroosmotic flow. These types of pH changes can have a significant effect on the soil's ζ-potential, solubility, ionic state and charge, and the adsorption of contaminants. It is, therefore, desirable to control the pH of the fluids in the vicinity of the electrodes as well as the volume and type of fluid transported from the anode to the cathode.

The electrical charge on the surface of soil is important to the transport of liquids by electroosmosis. The charge imparted on the soil when in contact with an aqueous solution results from a number of effects, including chemical and physical adsorption and the composition of the aqueous solution and its pH. Several reports have shown that an acid front moving through the soil in the direction from anode to cathode reduces and eventually stops the electroosmotic flow. It would be beneficial to monitor and adjust the pH in the wells to impart the desired charge on the soil thus maintaining an appropriate rate of electroosmotic flow.

When current is applied through the soil, a net flux of fluid occurs by electroosmosis. This may cause a net loss of water from the vicinity of some electrodes and a net gain of fluid in the vicinity of other electrodes. It is also important to note that the rate of loss from any particular well area may be different from nearby or adjacent wells. It is unlikely in a field installation that the electroosmotic flow rate will be the same for any two wells. This is due to the fact that earth, soil and sediments, etc., are heterogeneous. Large variations in physical properties of the soil (e.g., permeability to water) may occur within short distances from a given point. Additionally, electrodes may be positioned in different locations relative to the depth of the water table which will also affect the fluid conditions around a particular electrode. In a given electrode array, the regions around some electrodes may experience high fluid losses while other electrodes in the array may experience large fluid gains. Therefore, there is a need to manage the flow of fluids into and out of the wells on individual well basis.

Another aspect of fluid management involves contaminant recovery. Contaminants present in soil tend to accumulate in the vicinity of the electrodes as well as in the electrode wells. Some metals will electroplate onto the electrode itself, however, the contaminants usually accumulate in the fluid volume surrounding the electrode and the best method for removal is to recover the fluid surrounding the electrode. This results in an overall loss of fluid from the system. It is therefore desirable to concentrate contaminants in individual wells prior to removal of the fluid in order to maximize contaminant removal and minimize the amount of fluid removed from the system.

Electroremediation processes must lend themselves to large scale field applications, since most sites in need of de-contamination are greater in size than the typical bench scale setup used for research purposes. A variety of fluid additions and removals are required to manage the needs of each individual well and remove the contaminants from the wells. Ideally, each well would have a water supply line, an acid supply line, a base supply line, and a fluid removal line. However, when a site is 30 to 50 feet square and 20–50 electrodes are required for electroremediation, having four fluid lines connected to each well is impractical to install and manage. A system that is simple in design yet allows for individual fluid management of each individual anode and cathode well would be very beneficial.

SUMMARY OF THE INVENTION

The present invention provides a system for electrokinetic treatment of soil. The system comprises a plurality of anode and cathode structures disposed in the soil, a fluid supply and recovery manifold, and a flow control system. Each of the plurality of anode structures has a well and an anode positioned within the well. Each of the plurality of cathode structures has a well and a cathode positioned within the well. The cathode structures are positioned in a spaced apart relationship from the anode structures. The fluid supply and recovery manifold is in fluid communication with each of the plurality of anode structures and each of the plurality of cathode structures. Preferably, the flow control system includes a fluid delivery line, a fluid removal line, an effluent disposal element. The fluid delivery line is in fluid communication with the fluid supply and recovery manifold. Preferably, a plurality of fluid delivery lines are provided in fluid communication with the fluid supply lines. The fluid removal line is in fluid communication with the fluid supply and recovery manifold. The effluent disposal element in fluid communication with the fluid removal line. The flow control system is in fluid communication with the fluid supply and recovery manifold for controlling the transport of fluids from the anode and cathode structures to the fluid removal line and from the fluid delivery line to anode and cathode structures.

A sensor element may be provided in fluid communication with the fluid supply and recovery manifold and preferably at least one pump is in communication with the sensor element for pumping fluid between the sensor element and the fluid supply and recovery manifold. The sensor element may include a vessel having a metal ion measuring system and a pH sensor. In addition, a means for clearing the fluid supply and recovery manifold, such as an air compressor, may be used in fluid communication with the fluid supply and recovery manifold.

At least one valve is positioned between at least one anode structure and the fluid supply and recovery manifold, and at least one valve is positioned between at least one cathode structure and the fluid supply and recovery manifold. Preferably, at least one valve is positioned between each anode structure and the fluid supply and recovery manifold, and at least one valve positioned between each cathode structure and the fluid supply and recovery manifold. The valves are useful for isolating the fluids within each individual well so that the fluids from one well is not mixed with the fluids from another well. The valve elements can be actuated by a control means in electronic communication with each of the valve elements.

Preferably, the anode has a gas recovery line in fluid communication with the anode well for removing gases generated within the anode well and a gas scrubber in fluid communication with the gas recovery line.

The fluid levels in the wells can be monitored by providing a plurality of cathodes, preferably each of the cathodes, with at least one fluid level sensor in the well and at least one of the anodes with at least one fluid level sensor in the well. Preferably, the cathode has a fluid intake line positioned at a predetermined level within the well and a fluid withdrawal line that is positioned below the fluid intake line. The fluid intake line and fluid withdrawal line are in fluid communication with the fluid supply and recovery manifold.

In order to monitor various properties of the soil, at least one temperature sensor may optionally be positioned in the soil between the anode structures and the cathode structures and at least one voltage probe may optionally be positioned in the soil between the anode structures and the cathode structures.

The invention also provides a method that may be used for electrokinetic transport of contaminants through a porous medium. The method includes positioning a plurality of anode wells and a plurality of cathode wells in the porous medium in a spaced apart relationship. One or more fluid supply and recovery manifolds may be provided, so that a plurality of anodes and the cathodes are in fluid communication with a common fluid supply and recovery manifold. An electric field is formed between the anodes and the cathodes. A minimum fluid level is maintained in the anode wells and the cathode wells during most of the remediation process. Fluid is transported to and from the anode wells and the cathode well through the fluid supply and recovery manifold. The contaminant concentration can be monitored in the fluid in each well and preferably in the anode fluid in each anode well. This method may be used to transport organic and inorganic materials such as contaminants, water or fertilizer.

In addition, the pH level may be monitored to maintain a minimum pH in each of the anode wells and cathode wells. The fluid level may be monitored in at least one anode well. The fluid level may be monitored in at least one cathode well. The fluid level of an individual anode well may be adjusted when the fluid level in that well reaches a predetermined level. The fluid level in an individual cathode well may be adjusted when the fluid level in that well reaches a predetermined level. All of the fluid may be withdrawn from the anode well when the metal ion concentration reaches a predetermined level.

Preferably, a portion of the fluid from the anode fluid volume of at least one anode well may be withdrawn through the fluid supply and recovery manifold. The withdrawn fluid may then be transported to a sensor element where the physical and chemical properties of the fluid can be measured. The metal ion concentration of the withdrawn fluid can then be measured. The withdrawn fluid can then be returned to the anode or discarded. Finally, compressed air can be injected into the fluid supply and recovery manifold to clear any residual fluid in the fluid supply and recovery manifold. The pH of the anode fluid volume may be maintained within a specified range by measuring the pH of the anode fluid volume from at least one anode well and adding a pH adjusting solution. In addition, the pH of the cathode fluid volume may be maintained within a specified range by measuring the pH of the cathode fluid volume from at least one cathode well and adding a pH adjusting solution.

Preferably, a portion of the fluid from the cathode fluid volume of at least one cathode well is withdrawn through the fluid supply and recovery manifold. The withdrawn fluid is then transported to a sensor element. The metal ion concentration is measured in the withdrawn fluid. Finally, compressed air is injected into the fluid supply and recovery manifold to clear any residual fluid in the fluid supply and recovery manifold.

The soil temperature between the anode structures and the cathode structures may be measured and maintained above or below predetermined levels. Furthermore, the voltage of the soil between the anode structures and the cathode structures may also be measured and adjusted based on the temperature measurement.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides a system for managing fluids, including fluid volume, pH, contaminant concentration, and conductivity in anode and cathode wells during electroremediation of contaminants in a porous medium, such as soil.

One aspect of the present invention provides a system to monitor the fluid gain and loss from a series of electrode wells positioned in a porous medium and maintain optimal fluid levels in the wells on an individual basis. Fluid levels in one or more of the electrode wells are monitored and fluids are transferred to and from the wells through a manifold. A plurality of electrode wells are attached to the same manifold and the fluid transfer is initiated through valves at each electrode well and one or more pumps for transferring fluid to and from the wells through the manifold. Specific fluid additions can be made to the wells individually through the manifold.

The manifold includes a main line with side arms extending therefrom. Each anode and each cathode are typically connected to the side arms of the manifold. The manifold is in fluid communication with a plurality of fluid addition lines for adding fluids, such as acid, base or water to the electrodes. Each fluid addition line is separately controlled by a valve. The manifold is in fluid communication with an effluent vessel that is used for storing fluids removed from the electrode wells. The manifold is also in fluid communication with an air compressor for delivering a pulse of air to the manifold to minimize the amount of fluid remaining in the main line and side arms of the manifold after a fluid addition or withdrawal. Each electrode well is in selective fluid communication with the manifold through a valve.

Another aspect of the invention provides a system for monitoring and adjusting pH, and contaminant concentration in individual wells, and monitoring voltage at each electrode. The electrode wells are in fluid communication through a manifold to a sensor element thereby allowing for the transport of fluids between each electrode well, individually or collectively, and the sensor element. The sensor element is preferably connected to a control means that records and monitors the pH, contaminant concentration, and voltage values for each well.

An additional aspect of the invention provides a method for removing contaminants from soil using electrokinetic remediation. The method includes installing a series of electrode wells, preferably anodes and cathodes, in the porous medium. A manifold is used to connect all of the electrode wells. Fluid from one well is withdrawn through the manifold and sent to a sensor element where the contaminant concentration is measured. If the concentration is above a predetermined value, the fluid in the well is removed and sent to an effluent tank for subsequent removal. If the contaminant concentration is below the predetermined value, the fluid is returned to the electrode well. The sensor element may also be used to measure pH of the fluid in a plurality of wells or each well on an individual basis.

Figure 1:
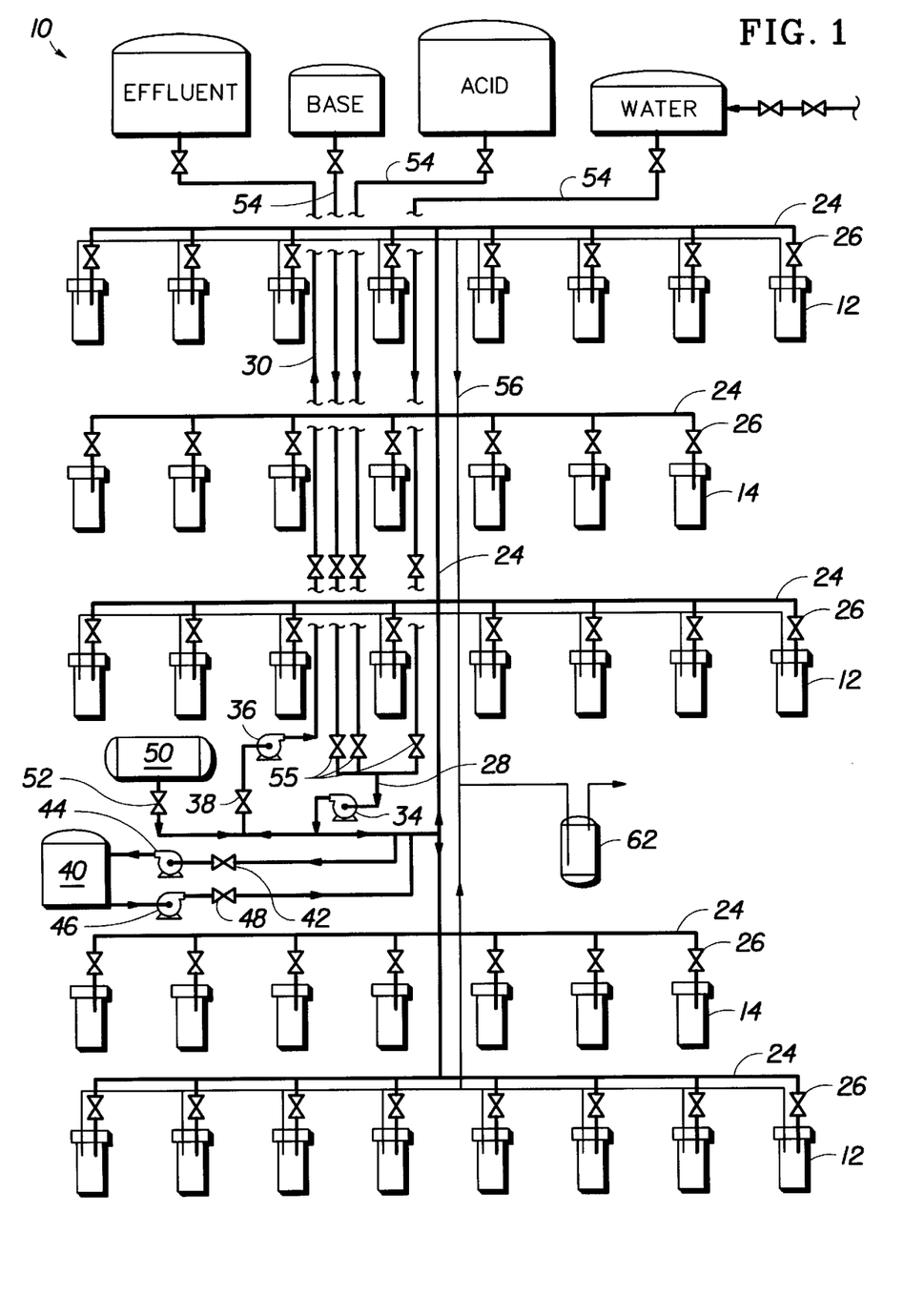
FIG. 1 is a schematic diagram of one embodiment of the present invention.

FIG. 1 shows a system for electrokinetic treatment of soil having a plurality of anode structures or wells 12 and cathode structures or wells 14 in a spaced apart relationship. Each anode and cathode is electrically connected to an external voltage source by the appropriate lead wires, not shown. For convenience, the electrical connections have been omitted. The spacing of the electrode structures in this figure is for illustrative purposes only and any number of well positions may be employed using the system described herein. The anode structures 12 and cathode structures 14 are inter-connected by a fluid supply and recovery manifold 24 for transferring fluids to and from the anode and cathode wells. The fluid supply and recovery manifold 24 is in selective fluid communication with each anode structure 12 and each cathode structure 14. Fluid flow through the system is controlled by a series of valves and pumps. In particular, a valve 26 is positioned near each individual anode and cathode structure, or at least small groupings of anodes or cathodes to control the fluid flow between the manifold 24 and any one or more of the anode and cathode structures. The fluid supply and recovery manifold 24 is responsible for delivering fluid to and removing fluid from each well either collectively or on an individual basis. The valves and pumps described herein can be controlled manually or electronically via a control member, such as a microprocessor based controller (not shown).

In the event the electroremediation site is part of a wetland or otherwise water saturated, the electrode structures may be elevated so that the top of the anode and cathode structures are not in risk of being submerged under water. The well height is important in wet soils, because if the electrodes get wet, they may short circuit or not function properly. In drier climates, the well height can be closer to the surface of the soil to minimize the visual impact of the system on the aesthetics of the area.

There is a fluid delivery line 28 in fluid communication with the fluid supply and recovery manifold 24 for delivering fluids to the wells such as, water, acid or base solutions. Likewise, there is a fluid removal line 30 in fluid communication with the fluid supply and recovery manifold 24 and delivering fluids to an effluent vessel where they can be collected and sent to a waste treatment facility. It should be recognized that various piping arrangements may be designed to couple one or more fluid sources and one or more fluid destinations to the manifold 24 and that the specific configuration of FIG. 1 is merely a preferred embodiment.

The system 10 preferably employs a plurality of fluid supply lines 54 in fluid communication with the fluid delivery line 28 to deliver fluids such as, acid, base and water to the electrode wells. Fluid flow from each of these fluid supply lines can be controlled by valves 55 and a pump 34 that may be manually or electronically actuated by the control member. Upon receipt of a command form the control member, the appropriate valve 55 is opened and fluid travels from the fluid supply line 54 to the fluid delivery line 28, while the appropriate valve 26 is opened and the fluid is delivered to the well. Once the fluid is received by the appropriate well, the means 50 then delivers compressed air to the fluid supply and recovery manifold 24 to flush out the bulk of the fluid that may be remaining in the manifold 24. The control member can be a microprocessor that is programmed to receive information regarding the status of the wells, such as, voltage, fluid level, pH, contaminant concentration etc., and initiate an appropriate response.

A flow control system in fluid communication with the supply and recovery manifold 24 is used to control the flow of fluids between the anode and cathode structures 12 and 14, respectively, and the fluid removal line 30, and between the fluid delivery line 28 and the anode and cathode structures 12,14. In particular, the fluid delivery line 28 may transport fluids to the fluid supply and recovery manifold 24 via a pump 34. Note that pump 34 would not be necessary if the fluids were fed into the manifold 24 by gravity. The fluids are transported through the manifold 24 to the well or wells with an open valve 26. (How do you direct the flow from the delivery line 28 into a specific well?) Likewise, fluid flowing from the well or wells to the manifold 24 and also from the manifold 24 to the fluid removal line 30 is also controlled by a pump 36 preferably positioned downstream of a valve 38.

Additionally, a means 50 in fluid communication with the fluid supply and recovery manifold 24 is used to clear the fluid supply and recovery manifold 24. The means 50 can be an air compressor and is controlled by a valve 52 between the means 50 and the manifold 24. The means 50 is used to flush fluids delivered to individual wells from the fluid delivery line 28, via manifold 24. It is desirable to flush fluids out of the manifold to reduce or eliminate mixing of fluids in the manifold 24 between fluid transfers between the manifold 24 and individual wells. This is important because certain wells will require fluid additions having specific characteristics, such as pH, while others require different fluids, and the mixing of the two will dilute the desired effect at the well. Additionally, the opportunity for residual fluid in the manifold 24 to act as a conductor and short circuit the electrodes is reduced or eliminated.

It is preferred that the system include an optional sensor element 40 in fluid communication with the fluid supply and recovery manifold 24. A valve 42 between the manifold 24 and the sensor element 40 and a pump 44 downstream of the valve 42 may control the flow of fluids into and out of the sensor element 40. Alternatively, the valve 42 and pump 44 may be used for fluid intake while a second pump 46 a second valve 48 upstream of the second pump 46 may be used to control the exit of fluids back to the manifold 24. The sensor element 40 can be used to measure any number of parameters such as metal ion content, conductivity, and pH of a fluid volume recovered from all the wells or any individual well. Contaminant concentration, such as metal ion content, can be measured by standard Environmental Protection Agency methods. The pH can be measured using a commercially available pH meter and the conductivity can be measured with voltage probes positioned in the fluid. The pH meter can be positioned in the sensor element 40 or in fluid communication with the manifold line between valve 42 and the sensor element. Fluid can be transported from one well or several wells to the sensor element 40, measured and then returned to the well or removed from the system 10.

Figure 2:
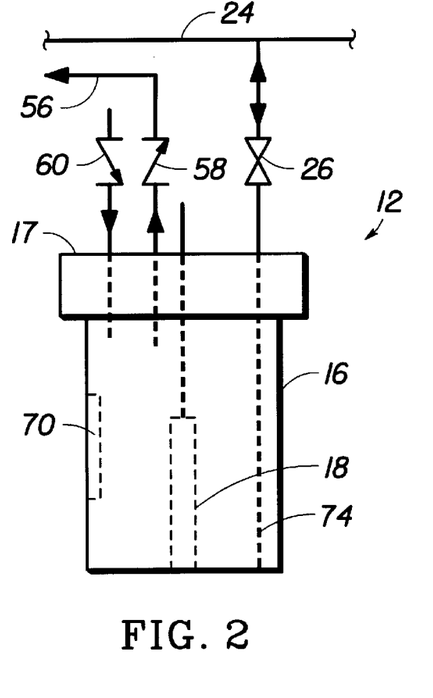
FIG. 2 is a schematic diagram of an anode structure of the present invention.

FIG. 2 is a schematic view of one design for the anode structure 12. Each anode structure has a well 16 and an anode 18 positioned within the well 16. The anode structure 12 is connected to the fluid supply and recovery manifold 24 by a valve 26. The valve 26 can be a solenoid valve that can be electronically and/or manually controlled. Fluid is delivered and withdrawn from the well through tube 74. The top of the anode well is sealed by a cap, which is preferably detachable from the well 16, and has a gas recovery line 56 in fluid communication with the anode well for removing gases present in the anode well 16. The gas recovery line 56 is controlled by a gas check valve 58. Gases in the anode well can be generated within the anode, sucked in, or blown in by the means 50. If the anode well 16 is to be purged of all fluid, the check valve 60 opens to break the vacuum that may form in the well and inhibit the withdrawal of the anode fluid volume. Gas produced in the anode well 16 is removed and sent to a gas scrubber 62 in fluid communication with the gas recovery line 56. (See FIG. 1). The gas recovery line 56 is connected to each anode well by the same line. Depending on the application, it is possible for the anode to generate potentially toxic or noxious gases. It is desirable to contain these gases and remove them from the anode well in a controlled manner. If the field application does not involve the production of problematic gases within the anode well, the gas recovery line 56 and scrubber 62 are not necessary and the anode may be vented to the atmosphere.

Figure 3:
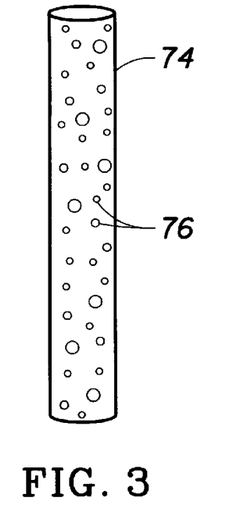
FIG. 3 is a schematic diagram of a fluid delivery tube used in the present invention.

Referring to FIG. 3, fluid is transferred to and from the anode fluid volume through a tube 74 having several holes 76 or perforations distributed along the length of the tube. The holes 76 account for the concentration gradients present in the well fluid volume and allow for the withdrawal of fluids that are representative of the entire fluid volume in the well. This reduces the risk of withdrawing fluid from a single phase present in the fluid volume as well as aiding in mixing fluids as they are withdrawn, returned or added.

Figure 4:
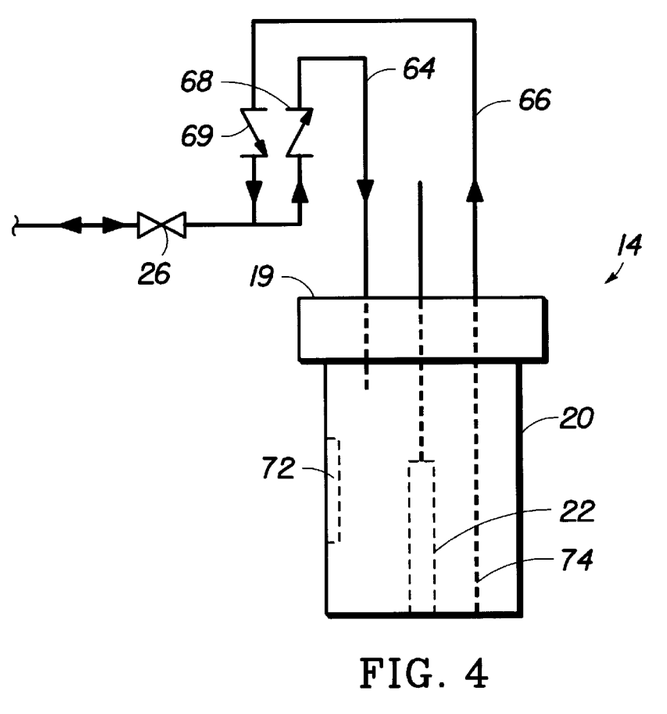
FIG. 4 is a schematic diagram of a cathode structure of the present invention.

FIG. 4 shows a schematic view of a cathode structure 14 that may be used in the present invention. Each cathode structure 14 has a well 20 and a cathode 22 positioned within the well 20. The wells referred to herein consist of a casing that encloses the electrode and can be made of a variety of porous materials. Optionally, the top of the cathode well may also contain an air-tight cap or seal 19 through which various tubes extend. The cathode has a fluid intake line 64 terminating at a predetermined level within the well and a fluid withdrawal line 66 preferably terminating below the fluid intake line 64. The fluid intake line 64 and fluid withdrawal line 66 are controlled by check valves 68, 69 that are in fluid communication with the fluid supply and recovery manifold 24 between the well 20 and the valve 26. The fluid intake and withdrawal lines terminate at different elevations so as to promote mixing of the fluids within the cathode well.

During electroremediation, fluid is generally lost from the anode well and gained in the cathode well. The system 10 of the present invention preferably uses level sensors 70, 72 to monitor fluid levels in the cathode and anode wells. (See FIGS. 2 and 4). In this embodiment, each of the plurality of cathodes has a fluid level sensor 70 in the well to monitor for flooding conditions at the cathode. Likewise, it is preferred that at least one of the anode structures have a fluid level sensor 72 in the well. In addition to monitoring fluid volumes within the cathode and anode, the electroosmotic flow rate through the soil may be determined based on the change in the fluid level in the anode and/or cathode wells over time.

It should be understood that applying a current through soil will typically act to increase the soil temperature. Given this situation, it is preferred that at least one temperature sensor, such as a thermocouple made by Omega and at least one voltage probe made from a stainless steel rod coated in polytetrafluoroethylene are positioned in the soil between the anode structures 12 and the cathode structures 14. The temperature sensor can be used to monitor the temperature of the soil based on a reference temperature sensor positioned outside the area between the electrodes. The voltage probe is used to measure the voltage in the soil between the electrode.

The present invention also provides a method for electrokinetic transport of contaminants through a porous medium. A plurality of anodes and a plurality of cathodes are positioned in a porous medium in a spaced apart relationship. Each of the anodes are surrounded by a porous well having an anode fluid contacting at least a portion of the anode and each of the cathodes are surrounded by a porous well having a cathode fluid contacting at least a portion of the cathode. The anode wells and the cathode wells are in fluid communication with a single fluid supply and recovery manifold. Electrokinetic transport is initiated by forming an electric field between the anode and the cathode. A minimum fluid level is maintained in the anode wells and the cathode wells, preferably by monitoring readings transmitted from the level sensors in the well or wells, so that when the fluid level is too low, fluid is added etc. Alternatively, the fluid levels may be monitored manually. Additionally, the metal ion content of the anode fluid volume in each anode well and the metal ion content of the cathode fluid volume in each cathode well can be monitored.

Preferably, the fluid level is monitored in at least one anode well and each cathode well. When the fluid level in the anode well reaches a predetermined level, the fluid level in the anode wells can be adjusted by adding or removing fluid. Likewise, when the fluid level in the cathode well reaches a predetermined level, the fluid level can be adjusted by adding or removing fluid. Typically during electroremediation, water is transported toward the cathode, away from the anode and thus, fluid additions are more common at the anode.

A portion of the fluid from an anode/cathode well may be withdrawn through the fluid supply and recovery manifold 24 and transported to a sensor element 40. The sensor element 40 measures the contaminant concentration in the withdrawn fluid. The fluid may either be returned to the anode/cathode well through the manifold 24 or sent to the effluent tank through the fluid removal line 30. Finally, if the fluid is returned to the anode well, compressed air from means 50 may be injected into the fluid supply and recovery manifold 24 to clear any residual fluid in the fluid supply and recovery manifold 24. The compressed air typically does not remove all the fluid from the manifold because during fluid delivery and withdrawal a portion of the fluid may flow to areas in the manifold that are not adjacent to the well in question and the fluid will remain in those areas until the wells nearby are serviced. Additionally, the act of blowing air into the manifold 24 may push fluid into regions away from the well in question, thus trapping the fluid in a potentially remote area. This issue is minimized by the use of small diameter tubing for the manifold so that the majority of the fluid is driven by the pump to the appropriate well. Alternatively, a series of valves may be used on either side of each intersection point in the manifold thereby allowing the control means to open only the appropriate valves and the fluid would flow through discrete portions of the manifold 24 to the appropriate well.

When the contaminant concentration, as measured by the sensor element, reaches a predetermined level in either the cathode or the anode, all of the fluid may be withdrawn and sent to the effluent tank or some type of waste treatment and processing site. Because the system 10 provides the ability to withdraw and return fluids to and from individual wells, the contaminant concentration, such as metal ions, in a particular well may be measured and if the concentration has not reached a predetermined value, the fluid is returned to the well. Therefore, we can concentrate contaminants within a given well or wells before discarding the fluid, thus reducing the volume of waste to be disposed, conserving water, and making disposal of the contaminants more efficient.

It is preferred that a pH level in each of the anode wells and cathode wells is maintained. The conditions required to maintain the optimum pH may be determined prior to setting up the electroremediation site such that actual monitoring of pH values on a regular basis is unnecessary.

During the electrokinetic process, the pH of the anode fluid and the cathode fluid may be maintained within a specified range. This can be done by withdrawing a portion of the fluid from at least one well (either anode or cathode), measuring the pH of the fluid, and adding a pH adjusting solution to the well if needed.

The pH of the fluid volume in the anode and cathode wells may be manipulated to control the rate of electroosmosis through the soil. Specific pH adjustments can be made to prevent a contaminant from precipitating in the soil and to preserve the integrity of the charge on the soil surface or $\zeta$-potential. $\zeta$-potential is important to electrokinetic remediation processes because, if left unattended, the reactions at the anode would generate H+ creating an acid front and eventually neutralize the negative charge on the soil and stop electroosmotic flow. Thus, a balance must be struck between acid and base additions to the electrode wells to maintain the contaminants in solution and maintain a charge on the soil.

In addition to manipulating the pH, the rate of electroosmosis can also be monitored and manipulated if necessary by adding specific chemicals to the wells to achieve maximum contaminant removal. The change in the level of fluid in the cathode and anode wells can be measured over time to determine the rate of electroosmosis through the soil. Once the rate of electroosmosis is determined, fluid additions may be made to maintain the electroosmotic flow.

The anode structure and cathode structure shown in FIGS. 2 and 3, have a level sensor in the well for determining the rate of change in fluid level in the well. The sensor provides information as to when the level of the fluid volume in a particular well reaches a certain point, and allows a controller to calculate flow rates into or out of the well based on how long the fluid volume takes go from one level to another level. The sensor is in electronic communication with a controller that records the time required for the fluid level to go from one point to another. Based on the time interval between different fluid levels the rate of electroosmotic flow can be determined. The level sensor may be one continuous strip as shown or there may be two or more sensors at different heights in the well.

The ability to measure the rate of electroosmotic flow enables one to control and optimize the electroosmotic flow to increase the efficiency of the electroremediation process. Many of the processes involved in electroremediation require the measurement of electroosmotic flow as one of the steps because the majority of contaminants move through soil via electroosmosis and specific chemical additions and fluid withdrawals are made to maintain certain soil conditions to maximize the rate of electroosmosis.

In a situation where the cathode level sensor indicates that the fluid level is low in the well, the computer can tell the fluid delivery line to deliver a fluid from one of the fluid supply lines to the cathode in question. The valves are opened and closed accordingly and the fluid is delivered to the well. The final step is to clear the manifold. This can be achieved by injecting a predetermined amount of air into the manifold to force the residual fluid into the cathode well. All of the fluid is not cleared from the manifold using the means 50, because there is only one manifold for the entire system, however the amount of fluid remaining in the manifold can be minimized by using small diameter pipe, preferably, about ½ inch, to form the manifold.

In the present invention, adjustments in the fluid content and volume can be made to any one well independently of other electrodes in the array. These adjustments can be made without having to withdraw solutions from the wells. There are one or more fluid additive lines 54 for providing specific chemical formulations into the manifold 24, each line being controlled by a manually or electronically actuated valve 55. (See FIG. 1). Each well is connected to the fluid supply and recovery manifold 24 and a valve 26 that controls fluid going into and out of the well. The addition of a specific chemical can be made directly to an individual well by actuating the pump 34 and the appropriate valve 26 for the desired well.

The system of the present invention, increases the efficiency of the electroremediation process because it is designed to meet the changing and varied needs of all the electrodes in an electrode array. With regards to certain electrodes, the requirement for a specialized chemical may be low, whereas the requirement for water may be high. The specialized chemical can be added to the individual well without having to treat an entire fluid circulatory system that may be servicing many wells. The soil in a region adjacent a certain electrode well may be highly porous or fractured so as to suffer from rapid draining. Other electrodes may experience high current and are subject to great changes in pH. These are only some examples of varied needs of electrodes placed in soils and sediments. The variation is caused by the non-uniform properties of earth, soil sediments, etc.

Typical acidic fluids that may be added to the wells can include the following materials or mixtures thereof: glutamic acid, butyric acid lactic acid, dibasic acid, citric acid, and sodium bisulfate. There are also, organic acids and mineral acids from a natural (e.g., humic acids) or synthetic sources (e.g., nitric acid).

Contaminants typically migrate toward either the positive or negative electrodes in a uni-directional fashion because the contaminants are either positively or negatively charged. However, some metals have both cationic and anionic forms. For example, chromium can exist as either a positive (cationic) or negative (anionic) species. When a current is applied, the cations move toward the anode and the anions move toward the cathode. In addition, electroosmotic flow may act to increase the accumulation of ionic species around the electrode wells. The net result is an accumulation of chromium in the regions around both the anode and cathode. There are many other examples of bidirectional movement and accumulation of contaminants, such as arsenate's and pertechnates. The system shown in FIG. 1 allows for the systematic removal of contaminants from both the anode and the cathode wells as needed.

The following examples show how the apparatus meets needs of different remediation strategies used under different conditions in the field.

EXAMPLE 1

The system disclosed above was used at a site having the following soil conditions: high water table; sandy soil; and metallic contaminants. The water table was high (i.e., it was at least higher than the lowest point of the electrode wells below the surface) and the soil matrix immediately surrounding the wells was saturated with water, so the tendency was for fluids not to flow out of the well in significant amounts when electroremediation is turned off. There were metallic contaminants such as chromium and cadmium ions in the surrounding soil. The prevailing sandy soil conditions did not support significant electroosmotic flow (e.g., no electrically driven net flux of fluid towards the cathodes).

The apparatus for fluid management according to FIG. 1 was operated using a three-step process.

Monitoring (All Wells)

After commencing the electroremediation process, it is desirable to monitor the fluids from all wells or at least a representative group of wells, were monitored on an individual basis. Fluid was withdrawn from a well by activating valve 42, operating pump 44 and transferring fluid to the sensor elements 40 until a level sensor in the sensor element 40 signaled that sufficient fluid had been withdrawn. Sensor devices, housed within the sensor element 40 measured the fluid pH and contaminant concentration. After the properties had been measured, the fluid was returned to the exact well from which it was taken. This was accomplished by opening valves 46 and 26 at the desired well and activating pump 48. After the fluid was returned, compressor 50 was activated in combination with valve 52 and air was passed through the lines to expel all residual fluid from the manifold back into the well. Normal operation involves sequential examination of the fluid properties in each well one after the other. The wells were monitored once per hour initially and then once per day. The examination of the individual properties of the fluid in the well may be performed once per hour or several times per hour.

Fluid Chemistry Adjustment (Selected Wells)

It is desirable to maintain the chemical properties of the well fluids in a specific range. It is desirable under the above described soil conditions that pH is controlled in an individual well, or plurality of wells, so that it never goes higher than pH=4. The monitoring sequence detects when the pH in any well has exceeded this value and initiates a fluid chemistry adjustment sequence. The apparatus initiates pH adjustment to only those wells that need it. Valve 26 will open on the individual well that needs adjustment. It can be either a well containing an anode 12 or a well containing a cathode 14. Pump 34 will be activated, and valve 55b opened. Acid will be supplied through line 54. Addition will continue for a predetermined time or until an upper level indicator is activated in the well 12. After the addition of the fluid is complete, compressor 50 is activated to expel fluid from the common manifold lines and the well's valve 26 is closed. The fluid chemistry control sequence can be applied when the pH in a well becomes too low, for example when it decreases to below pH 1. Fluid will be added through a base tank, via line 54, valve 55a and pump 28 in the same way as the acid.

It should be noted that there are several variations to the fluid chemistry adjustment sequence. For example, a plurality of wells can have their pH adjusted at the same time or the type of fluids added may vary from well to well. Types of fluids that can be added to the well include, but are not limited to: 1.) complexing (chelating) agents, such as EDTA (ethylene diamine tetraacetic acid), NTA (nitrotriacatic acid), citric acid and mineral acids; 2.) surfactants, such as tween 80 and sorbitol; and 3.) nutrients and inorganic salts, such as nitrates, phosphates, and ammonium ions. Weak organic acids such as acetic acid, formic acid, citric acid, oxalic acid and salicylic acid may be used for their chelating properties and pH adjusting properties in the soil.

Fluid Withdrawal (Selected Wells)

The contaminant concentration in the fluid in a particular well or wells is expected to accumulate over time due to the electroremediation process. The concentration increases to a certain level, at which it is desirable to remove the entire fluid from this particular well at this concentration (for example, the predetermined concentration for fluid removal could be 5000 ppm). The information gained from the monitoring step and the fluid chemistry adjustment step described above indicate when this contaminant concentration has been reached. To withdraw the solution from the well in question, valve 26 of the well is opened, pump 36 is activated, valve 38 is activated and the fluid in the well is transferred to the effluent tank, via line 30. Fluid is withdrawn until the entire volume of the well has been pumped out. This can be determined from the flow rate of pump 36 and by activating the pump for a predetermined time. After the fluid has been withdrawn, compressor 50 is activated in combination with valve 52 and air is passed through the lines to expel all residual fluid from the manifolding into the effluent tank or back into the well. By refilling the manifold entirely with air and closing valve 26, the fluid in the well is isolated from fluids in the other wells in the array and from other parts of the manifolding system. It is important to keep the wells isolated, to prevent a short circuit through the fluid in the lines and to prevent the wells from receiving fluids that have the wrong pH or other additive. Fresh fluid is then added to the well from the water (fluid) tank through line 54 and by activating the valves 26 and 55, as selected above, and pump 34. However, it may not be necessary to perform this step as the soil is saturated, so water will naturally refill the well due to a hydraulic gradient across the well casing.

The fluid withdrawal step may also be accomplished using a level sensor positioned at the bottom of the well, rather than a dual level sensor well. Alternatively, an ultrasonic sensor can indicate the water volume removed or added to the well. The pump is pre-calibrated to operate for a time sufficient to remove a specific volume of fluid from the well.

It is not desirable to withdraw and discard fluids from any of the wells until the contaminants in the well have reached a predetermined concentration because in this example, contaminant accumulation rates differ from well-to-well. Because each well is treated individually, and the fluid remains isolated in each individual well and not mixed with fluids from any other part of the system, concentration of the contaminant in a particular well is achieved. In other words, the fluid withdrawal and discard sequence is only activated when a predetermined amount of contaminant has been accumulated in the fluid of an individual well. This approach allows for the adaptation of the system for sites with nonuniform contaminant distribution. Thus, contaminants are first accumulated in the well fluid volume and selectively extracted from the wells with the highest contaminant concentrations.

EXAMPLE 2

(Hypothetical)

The system disclosed above may be used at a site having the following soil conditions: high water table, clay soil, and metallic contaminants such as chromium and cadmium. The water table is high, (i.e., it is at least higher than the lowest point of the electrode wells below the surface). The soil matrix immediately surrounding the wells is saturated with water, so the tendency is for fluids not to flow out of the well in significant amounts when electroremediation is turned off. The predominately clay-type soil in the vicinity of the electrode array causes electroosmotic flow to occur through the soil between the electrodes. Some electrode wells will accumulated fluids, others will lose fluids, depending upon the direction of electroosmotic flow.

After the electroremediation process is started, the monitoring, fluid chemistry adjustment, and fluid withdrawal steps would be carried out in the same manner as in Example 1. A fluid level adjustment step would be carried out as detailed below.

Fluid Level Adjustment (Selected Wells)

The apparatus in FIG. 1 includes elements for monitoring the fluid levels and changes in fluid levels in the wells. This monitoring occurs on a continuous, semi-continuous or periodic basis. The fluid level adjustment sequence is applied to an individual well or a plurality of wells based on level sensor readings.

With the soil conditions described above, there would be a net flux of fluid out of certain electrode wells due to electroosmosis; therefore, it would be desirable to periodically provide make-up fluid to individual electrode wells. Fluid will be added to an individual well e.g., an anode well 12 or cathode wall 14, by opening valve 26, activating pump 34, opening valve 55c and adding fluid via line 54. Fluid is preferably added until an upper sensor point is reached. Fluids that can be added include, but are not limited to: water, acidic solutions, alkaline solutions, and solutions containing other chemicals such as complexing or chelating agents.(discussed in Example 1). The computer system or controller records how many times the fluid addition event occurs. Hence, from this measurement, the system measures the amount of electroosmotic flow into and out of an individual well over time.

The electroosmotic flow may also be monitored using a well with only a single low level sensor rather than a dual upper and lower level sensor. When the low level sensor is triggered, fluid addition takes place, using the pump preferably programmed to operated for a preset time. The flow rate of the pump is known the amount of fluid added can be determined from duration of operation of the pump. From the number of refilling events per day, the amount of fluid replacement needed to compensate for losses due to electroosmotic flow can be calculated. Therefore, a single level sensor well design can be used by the system to measure electroosmotic flow on a well-to-well basis. Alternatively, an analog sensor, such as an ultrasonic or capacitive sensor can be used to continuously monitor water level changes in the well. Fluid is added until predetermined fluid levels are reached based on the sensor's response.

While fluid losses occur in certain wells, fluids will also be accumulating in other wells due to electroosmotic flow. It is therefore desirable to periodically remove fluids from a certain well or plurality of wells. This is accomplished from an individual well e.g., cathode well 14, by opening valve 26, activating pump 36, and opening valve 38. Fluid is conveyed through pipe 30 to the effluent tank. Fluid will be removed until a low sensor point is reached. The controller records how many times the removal event occurs per day. Because the volume of the well between the upper and lower sensor points is known, the amount of fluid removed because of electroosmotic flow into the well is known. Therefore, the system measures and records electroosmotic flow on a well-to-well basis. After the removal event, the compressor system is activated to expel residual fluids from the manifold and valve 26 is closed.

The electroosmotic flow may be accomplished using only one level sensor placed at the high level point in the well. When the fluid removal takes place, the pump has been programmed to operated for a preset time. Since the flow rate of the pump is known, we can determine the amount of fluid removed from the time span the pump is operated. From the number of fluid removal events per day, we can calculated the amount of fluid entering a well due to electroosmotic flow. Therefore, the system measures electroosmotic flow on a well-to-well basis.

EXAMPLE 3

(Hypothetical)

The system disclosed above may be used at a site having the following soil conditions: low water table, sandy soil, and metallic contaminants such as chromium and cadmium ions. The water table is low (i.e., it is at least lower than the lowest point of the electrode wells below the surface). The soil matrix immediately surrounding the wells is, therefore, not saturated with water, so the tendency is for fluids is to drain out of the well in significant amounts on a continuous basis. The soil conditions are predominantly of a sandy type so that electrically-driven electroosmotic flow does not occur through the soil between the electrodes during electroremediation. After the electroremediation process is started, the following fluid management steps are used in conjunction with the apparatus similar to that shown in FIG. 1. The monitoring, fluid chemistry adjustment, and fluid withdrawal steps are carried out according to Example 1. Fluid level adjustment step is required due to the downward drainage typical of sandy soils.

Fluid Level Adjustment (Selected Wells)

A modified fluid level adjustment step would be needed because of the unsaturated soil conditions making it necessary from time to time to add make-up fluids to all the wells in the sequence including the cathodes. Therefore, a fluid withdrawal sequence is not included in this step.

Fluid will be added to an individual well e.g., wells 12 or 14, by opening valve 26 of the well in question, activating pump 34, opening valve 55c and adding fluid via line 54. Fluid will be added until an upper sensor point is reached. Fluids that can be added include without limitation: water, acidic solutions, alkaline solutions, and solutions containing other chemicals such as complexing or chelating agents. The system records how many times the fluid addition event occurs. In doing so, the amount of fluid added to a particular well is recorded over time. The same may be accomplished using a well with only an upper sensor rather than a dual upper and lower level sensors. When the fluid addition takes place, the pump has been programmed to operated for a preset time. The flow rate of the pump is known, therefore, from predetermined duration of operation of the pump, we can determine the amount of fluid added. From the number of refilling events per day, we can calculate the amount of fluid replacement need to compensate for losses due to drainage.

While the foregoing is directed to the preferred embodiment of the present invention, other and further embodiments of the invention may be devised without departing from the basic scope thereof, and the scope thereof is determined by the claims which follow.

We claim:

1. A system for electrokinetic treatment of soil comprising:

a plurality of anode wells disposed in the soil, each anode well having an anode disposed therein;

a plurality of cathode wells disposed in the soil, each cathode well having a cathode disposed therein, wherein the cathode wells are positioned in a spaced apart relationship from the anode wells;

a common fluid supply and recovery manifold in fluid communication with the plurality of anode wells and the plurality of cathode wells; and a flow control system in fluid communication with the fluid supply and recovery manifold for controlling the transport of fluids to and from the anode and cathode wells.

2. The system of claim 1, wherein the flow control system includes:

a fluid delivery line in fluid communication with the fluid supply and recovery manifold;

a fluid removal line in fluid communication with the fluid supply and recovery manifold; and an effluent disposal element in fluid communication with the fluid removal line.

3. The system of claim 1, further comprising a sensor element in fluid communication with the fluid supply and recovery manifold and at least one pump in communication with the sensor element.

4. The system of claim 3, wherein the sensor element comprises a vessel having a metal ion measuring system.

5. The system of claim 3, wherein the sensor element comprises a pH sensor.

6. The system of claim 1, further comprising a means for clearing the fluid supply and recovery manifold in fluid communication with the fluid supply and recovery manifold.

7. The system of claim 6, wherein the means for clearing the fluid supply and recovery manifold comprises a source of compressed air.

8. The system of claim 1, further comprising at least one valve positioned between at least one anode well and the fluid supply and recovery manifold, and at least one valve positioned between at least one cathode well and the fluid supply and recovery manifold.

9. The system of claim 8, further comprising a control means in electric communication with each of the valves.

10. The system of claim 1, further comprising at least one valve positioned between each anode well and the fluid supply and recovery manifold, and at least one valve positioned between each cathode well and the fluid supply and recovery manifold.

11. The system of claim 1, further comprising a plurality of fluid supply lines in fluid communication with the flow control system and at least one fluid source in communication with the plurality of fluid supply lines.

12. The system of claim 1, wherein the anode well further comprises a gas recovery line in fluid communication with the anode well for removing gases generated within the anode well and a gas scrubber in fluid communication with the gas recovery line.

13. The system of claim 1, wherein each of the plurality of cathode wells has at least one fluid level sensor in the well.

14. The system of claim 1, wherein at least one of the anode wells has at least one fluid level sensor in the well.

15. The system of claim 1, wherein the cathode well further comprises a fluid inlet line positioned at a predetermined level within the well and a fluid withdrawal line that is positioned below the fluid inlet line, wherein the fluid inlet line and fluid withdrawal line are in fluid communication with the fluid supply and recovery manifold.

16. The system of claim 1, further comprising at least one temperature sensor positioned in the soil between the anode wells and the cathode wells.

17. The system of claim 1, further comprising at least one voltage probe positioned in the soil between the anode wells and the cathode wells.

18. A method comprising:
- positioning a plurality of anode wells and a plurality of cathode wells in a porous medium in a spaced apart relationship;
- providing a single fluid supply and recovery manifold, wherein the anode wells and the cathode wells are in fluid communication with the single fluid supply and recovery manifold;
- forming an electric field between the anodes and the cathodes;
- transporting fluid between the anode wells and a flow control system through the fluid supply and recovery manifold; and
- transporting fluid between the cathode wells and a flow control system through the fluid supply and recovery manifold.

19. The method of claim 18, further comprising the step of:
- monitoring the physical and chemical properties of the fluid in each anode well.

20. The method of claim 18, further comprising the step of maintaining a minimum fluid level in the anode wells.

21. The method of claim 18, further comprising the step of:
- monitoring the physical and chemical properties of the fluid in each cathode well.

22. The method of claim 18, further comprising monitoring and maintaining a minimum pH level each of the anode wells and cathode wells.

23. The method of claim 18, further comprising:
- monitoring the fluid level in at least one anode well;
- monitoring the fluid level in at least one cathode well;
- adjusting the fluid level of an individual anode well when the fluid level in that well reaches a predetermined level; and
- adjusting the fluid level in an individual cathode well when the fluid level in that well reaches a predetermined level.

24. The method of claim 18, further comprising:
- monitoring the concentration of a target compound in the fluid in the anode well; and
- withdrawing all of the fluid from the anode well when the target compound concentration reaches a predetermined level.

25. The method of claim 18, further comprising:
- withdrawing a portion of the fluid from at least one anode well through the fluid supply and recovery manifold;
- transporting the withdrawn fluid to a sensor element; and
- measuring the chemical and physical properties of the withdrawn fluid.

26. The method of claim 25, further comprising the step of:
- injecting compressed air into the fluid supply and recovery manifold to clear any residual fluid in the fluid supply and recovery manifold.

27. The method of claim 25, further comprising the step of:
- transporting the withdrawn fluid to an effluent tank.

28. The method of claim 25, further comprising returning the withdrawn fluid to the anode well.

29. The method of claim 25, further comprising the steps of:
- maintaining the pH of the fluid in at least one anode well within a specified range by measuring the pH of the fluid from at least one anode well and adding a pH adjusting solution to the anode well; and
- maintaining the pH of the fluid in at least one cathode well within a specified range by measuring the pH of the fluid from at least one cathode well and adding a pH adjusting solution to the cathode well.

30. The method of claim 29, further comprising the steps of:
- measuring the temperature of the soil between the anode wells and the cathode wells;
- measuring the voltage of the soil between the anode wells and the cathode wells; and
- adjusting the voltage applied between the anode wells and the cathode wells based on the temperature measurement.

31. The method of claim 18, further comprising:
- withdrawing a portion of the fluid from the cathode fluid volume of at least one cathode well through the fluid supply and recovery manifold;
- transporting the withdrawn fluid to a sensor element; and
- measuring the chemical and physical properties of the withdrawn fluid.

32. The method of claim 31, further comprising the step of:
- injecting compressed air into the fluid supply and recovery manifold to clear any residual fluid in the fluid supply and recovery manifold.

33. The method of claim 18, further comprising the step of:
- maintaining the soil temperature between the anode wells and the cathode wells below a predetermined level.

* * * * *